(12) United States Patent
Mielenz

(10) Patent No.: US 11,557,125 B2
(45) Date of Patent: Jan. 17, 2023

(54) METHOD FOR MONITORING THE ENVIRONMENT OF A VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 16/813,208

(22) Filed: Mar. 9, 2020

(65) Prior Publication Data

US 2020/0293795 A1    Sep. 17, 2020

(30) Foreign Application Priority Data

Mar. 12, 2019    (DE) .................... 10 2019 203 345.8

(51) Int. Cl.
| | |
|---|---|
| *G06K 9/00* | (2022.01) |
| *G06V 20/56* | (2022.01) |
| *B60W 50/14* | (2020.01) |
| *B60K 28/00* | (2006.01) |
| *B60Q 9/00* | (2006.01) |

(Continued)

(52) U.S. Cl.
CPC .............. *G06V 20/56* (2022.01); *B60K 28/00* (2013.01); *B60Q 9/00* (2013.01); *B60W 50/14* (2013.01); *G06V 20/64* (2022.01); *G06V 40/10* (2022.01); *B60K 2028/003* (2013.01); *B60W 2050/143* (2013.01)

(58) Field of Classification Search
CPC ........ G06V 20/56; G06V 20/64; G06V 40/10; B60K 28/00; B60K 2028/003; B60Q 9/00; B60W 50/14; B60W 2050/143; B60W 2420/42; B60W 2554/4029; B60W 2554/404; B60W 2554/4044; B60W 2554/4045; B60W 2554/4046; B60W 2556/45; B60R 25/1012
USPC ............ 382/104; 340/426.1, 426.23, 426.26, 340/571, 686.1, 686.6
See application file for complete search history.

(56) References Cited

U.S. PATENT DOCUMENTS

| | | | | |
|---|---|---|---|---|
| 5,315,285 | A | * 5/1994 | Nykerk ................. | G08B 13/00 340/460 |
| 2005/0219042 | A1 | 10/2005 | Thomson | |
| 2014/0002651 | A1 | 1/2014 | Plante | |

(Continued)

FOREIGN PATENT DOCUMENTS

| | | |
|---|---|---|
| DE | 10 2017 118 737 A1 | 3/2018 |
| DE | 10 2017 115 582 A1 | 1/2019 |

*Primary Examiner* — Anh V La

(74) *Attorney, Agent, or Firm* — Maginot, Moore & Beck LLP

(57) ABSTRACT

A method for monitoring the environment of a vehicle includes evaluating physical measurement data obtained from the environment of the vehicle to determine whether at least one person is approaching the vehicle, how many people approach the vehicle may also be recorded. The method includes evaluating physical measurement data obtained from the environment of the vehicle to determine whether at least one person is moving away from the vehicle and, if appropriate, the number of people that are moving away from the vehicle is also recorded. The method further includes carrying out a check as to whether the number of people that have moved away from the vehicle corresponds to the number of people that have previously approached the vehicle. In response to the check resulting in a difference, it is determined that the vehicle is in an unsafe state.

13 Claims, 2 Drawing Sheets

(51) Int. Cl.
*G06V 20/64* (2022.01)
*G06V 40/10* (2022.01)

(56) References Cited

U.S. PATENT DOCUMENTS

| | | | |
|---|---|---|---|
| 2014/0218186 A1* | 8/2014 | Kawamoto | G01S 13/04 340/426.1 |
| 2015/0307048 A1 | 10/2015 | Santora | |
| 2018/0072218 A1* | 3/2018 | Sweeney | B60Q 1/2696 |
| 2018/0272992 A1* | 9/2018 | Gage | G06V 10/82 |
| 2018/0299900 A1* | 10/2018 | Bae | G05D 1/0238 |
| 2020/0180561 A1* | 6/2020 | Lane | G06V 40/103 |

* cited by examiner

METHOD FOR MONITORING THE ENVIRONMENT OF A VEHICLE

This application claims priority under 35 U.S.C. § 119 to patent application no. DE 10 2019 203 345.8, filed on Mar. 12, 2019 in Germany, the disclosure of which is incorporated herein by reference in its entirety.

The disclosure relates to securing vehicles, in particular commercial vehicles, against unauthorized access and against accidents during at least partially automated start-up.

BACKGROUND

Due to their size, commercial vehicles offer a variety of hiding places, some of which are also large enough for an adult. As a result, unauthorized people repeatedly conceal prohibited goods or even themselves on or in commercial vehicles. It is often the aim to cross national borders under the guise of normal goods transport by a company that is trustworthy to the border authorities.

If the goods or the concealed passengers are then discovered during a check, this can pose significant legal problems for the driver and the owner of the commercial vehicle. In more and more states it is then initially suspected that the driver and/or the owner participated in the unauthorized transport or at least tolerated it. Such an offence is punishable by considerable penalties, and until the case is resolved the vehicle and/or the driver may first be detained by the border authorities.

Therefore, there are various technical monitoring devices with which the concealment of goods or people while the vehicle is at a standstill can be detected. According to DE 10 2017 115 582 A1, the substructure of the vehicle is examined using camera images for objects that do not belong to the vehicle. According to US 2005/219 042 A1, the weight of a concealed passenger is registered by sensors on the air suspension.

SUMMARY

Within the context of the disclosure, a method for monitoring the environment of a vehicle has been developed. With this method, physical measurement data obtained from the environment of the vehicle are evaluated to determine whether at least one person is approaching the vehicle. If appropriate, the number of people that are approaching the vehicle is also recorded.

Physical measurement data obtained from the environment of the vehicle environment will continue to be evaluated to determine whether at least one person moves away from the vehicle. If necessary, the number of people that are moving away from the vehicle is also recorded.

Monitoring can be carried out, in particular continuously, as to whether people are approaching the vehicle or moving away from the vehicle, for example whenever the vehicle is stationary or with a speed below a predetermined threshold value.

A check will be carried out as to whether the number of people that have left the vehicle corresponds to the number of people that have previously approached the vehicle. As a response to the fact that the test shows a difference, it is determined that the vehicle is in an unsafe state.

This test may be carried out, for example, periodically, at irregular times, continuously or also on certain specific occasions, such as before the vehicle is driven off. There does not have to be only one definition of an "unsafe state" and, accordingly, not only one possible response.

It has been recognized that monitoring the environment of the vehicle can detect the concealment of people or goods already at the preparatory stage. Due to the large number of existing vehicle types and possible load configurations, as a rule the concealment of people and goods cannot be rehearsed in advance in such a way that, after the approach to the vehicle, one can proceed directly to action without much consideration. Rather, it takes at least a few minutes to explore the specific conditions. If the attempt is already detected at this stage and responded to with an audible and/or visible alarm, for example, then the probability is high that the offender will abort the attempt and instead turn to a less well-secured vehicle. In general, the offender is relatively indifferent to the vehicle in which he or the goods is/are concealed as long only as that vehicle is driving to the intended destination.

Furthermore, the monitoring of the vehicle environment, especially in the case of automatically driven commercial vehicles, can also prevent accidents involving people in the vehicle environment. Until now, it has been possible to rely on a vehicle in which no driver is sitting to stay in place, so that it does not pose any danger and, for example, one may be in front of or behind the vehicle. This will change with the advent of automated commercial vehicles. For example, the vehicle may receive a task to pick up a load at a certain location, ostensibly to drive off abruptly, and if it is an electrically powered vehicle, people in the surrounding area are not even warned beforehand by the loud starting of an internal combustion engine. As it will now be detected when people are present in the vehicle environment or even on or in the vehicle, a response can be made to this and the vehicle prevented from starting, for example.

It has also been recognized that the monitoring of whether people are approaching the vehicle or moving away from the vehicle does not require observation extending close to the outer skin of the vehicle without any gaps. On the contrary, it is already sufficient to be able to observe a strip-shaped area completely surrounding the vehicle, such as a strip formed into any ring shape. If a person passes through this strip towards the vehicle, this can be assessed as an approach to the vehicle. If a person passes through the strip away from the vehicle, this can be assessed as moving away from the vehicle. The thinking behind this is that cameras already in place on the vehicle and other sensors used for automated driving are often not designed for seamless observation that extends to the outer skin of the vehicle. Rather, objects within a certain distance of the actual vehicle are to be detected, for example, to keep the vehicle in a lane or to avoid collisions with other road users. Thus, in many cases this enables the specific evaluation of the data for people approaching or moving away with the sensors already present on the vehicle instead of having to install additional sensors.

In a particularly advantageous design, an additional check is carried out as to whether at least one person approaching the vehicle or moving away from the vehicle is showing predetermined suspicious behavior and/or carrying a predetermined suspicious object. In response to the positive outcome of this test, it is determined that the vehicle is in an unsafe condition.

The suspicious behavior may, for example, be walking at an unusual speed or walking with a posture aimed at concealing the person's presence and/or intentions. For example, the object may be a device that can be used to get into the vehicle or to attach a person or goods to the vehicle. The object may also be a prohibited product, such as a narcotic, for example.

Accordingly, in response to the fact that the additional test is positive, an optical and/or acoustic warning device and/or a closure and/or locking mechanism of the vehicle can be activated to prevent the person from further approaching the vehicle and/or from remaining on the vehicle and/or from entering the vehicle. These measures may be initiated individually or in combination, even if the vehicle was found to be in an unsafe condition for other reasons.

In a further particularly advantageous design, for each person that approaches or moves away from the vehicle, features that characterize that person are recorded in each case. If (i) not all people that have approached the vehicle have later moved away from the vehicle, and/or (ii) at least one person that has not previously approached the vehicle has moved away from the vehicle, it is determined that the vehicle is in an unsafe condition.

In this way, the detection of the unsafe condition is clearly refined, especially when the vehicle is in an area with a lot of public traffic. For example, a person that wants to hide in the vehicle may purposefully do this from a crowd of people. Conversely, a person that has previously concealed himself in the vehicle and that is leaving it at their destination may enter such a crowd. Both obfuscation tactics can be exposed by an individual recognition of people that approach the vehicle and move away from it. In the same way, it will also be more reliably detected whether people without bad intentions are in the environment of the vehicle and could be endangered by a sudden automatic start-up of the vehicle.

The individual recognition of people can be further refined. In a further particularly advantageous embodiment, it is also determined that the vehicle is in an unsafe state if one or more predetermined features of at least one person have changed in a predetermined way between two time points $t_1$ and $t_2$. One such change may indicate that the person has interacted with the vehicle in an unauthorized manner during his time in the environment of the vehicle.

For example, the predetermined feature may include that the person is carrying an object at one of the times $t_1$, $t_2$ that the person is not carrying at the other time $t_2$, $t_1$. If the person was carrying an object when approaching the vehicle and was no longer carrying it when he was moving away from the vehicle, he may have deposited it on or in the vehicle in order to use the vehicle to smuggle the object to a destination without the knowledge of the driver. If, when moving away from the vehicle, the person is carrying an object that he or she did not have when approaching the vehicle, he or she may have stolen it from the vehicle or removed it from the vehicle.

The physical measurement data may include in particular images of the environment of the vehicle, wherein any other imaging sensor, such as an infrared camera, a radar sensor or a lidar sensor can be used alternatively or even in combination with a camera sensitive to visible light. Such images are often needed anyway, in particular for automated commercial vehicles, so that no additional sensor hardware is required for the additional protection. Sharing of existing hardware not only saves costs for the hardware itself, but also costs for the necessary certification in obtaining approval for public transport.

In a further particularly advantageous embodiment, the physical measurement data include radio signals of at least one portable electronic device that is carried by a person approaching the vehicle or moving away from the vehicle. Such a device may in particular may be a mobile phone or a smartphone, for example. Especially people who want to cross national borders without permission often use smartphones as universal and easily transported tools for ongoing information gathering and organization. In extreme cases, the smartphone may even be the only significant object of value that the person owns. The probability that the person always carries the smartphone with him and also has it switched on is then particularly high.

The physical measurement data do not necessarily have to be obtained on board the vehicle itself. The measurement data obtained on board the vehicle can also be augmented or even replaced by measurement data obtained from other vehicles or from a fixed sensor infrastructure. For example, the sensors mounted on the vehicle itself, designed to monitor the environment of the vehicle while driving, may have "blind spots" immediately close to the vehicle that can only be seen from a different perspective. Physical measurement data representing a different perspective can be obtained, for example, via vehicle-to-vehicle (V2V) communication from at least one other vehicle, and/or via vehicle-to-infrastructure (V2I) communication from at least one stationary measuring device.

Also, the processing of the physical measurement data does not necessarily have to take place on board the vehicle but can also take place in a computer outside the vehicle or in a cloud. For example, the provision of a secure parking space for the vehicle may include as an additional service that the environment of the vehicle is monitored, and that the operator of the vehicle is informed of any suspicious activity. In this way, energy does not have to be constantly drawn from the vehicle battery while it is at a standstill.

Thus, in a further particularly advantageous embodiment, the physical measurement data are obtained at least partially from at least one other vehicle, and/or from at least one stationary measuring device.

Depending on what is considered an "unsafe state" in the specific use case, any appropriate reactions to such a state can be triggered.

For example, a start-up of the vehicle can be inhibited by intervening in an immobilizer and/or in at least one dynamic driving system. On the one hand, this will prevent unauthorized concealed people and/or goods from approaching their destination. On the other hand, accidents involving people in the environment of the vehicle that are not expecting the vehicle to be started automatically can be avoided.

If the vehicle is already driving, it can be stopped by intervening in at least one dynamic driving system. Accidents can then be avoided in situations where people have not noticed that the vehicle has started moving and are behaving as if the vehicle is still in its original position.

A communication link may be established between at least one person in the environment of the vehicle and an authority authorized to clarify the situation. For example, the person may be made aware that it is an automated vehicle and it is currently intended to put the vehicle into operation. The person can then confirm that they have understood the instruction and will get out of the way.

The vehicle may also be diverted to an authority authorized to clarify the situation and/or to a place specified by that authority, for example by intervening in at least one dynamic driving system and/or by intervening in at least one navigation system. For example, at a police station or at a similar location a check may be carried out as to whether there are actually concealed passengers or prohibited goods in or on the vehicle. The operator of the vehicle can then be protected from the adverse legal consequences that may result from continuing a journey to a national border, for example.

As explained above, the method can be implemented in whole or in part by computer and may also be entirely implemented without additional hardware in some configurations. The method may therefore be embodied entirely or in part in software which, as a direct customer benefit, brings about the described safeguarding of the vehicle against misuse and against accidents. Therefore, the disclosure also relates to a computer program with machine-readable instructions which, when executed on one or more computers and/or on a control unit, cause the computer or the computers and/or the control unit to carry out the described method. Similarly, the disclosure also relates to a machine-readable data medium and/or a download product with the computer program.

The disclosure also relates to a computer and/or to a control device with this machine-readable data medium and/or download product. However, the computer, or the control device, may also be specifically designed in any other way to perform the described method. Such a specific design may, for example, be based on the partial or complete embodiment of procedural steps in one or more field programmable logic gate arrays (FPGA) and/or in one or more application-specific integrated circuits (ASIC).

Further measures improving the disclosure are presented below in detail together with the description of the preferred embodiments of the disclosure on the basis of figures.

DETAILED DESCRIPTION

Figure 1:
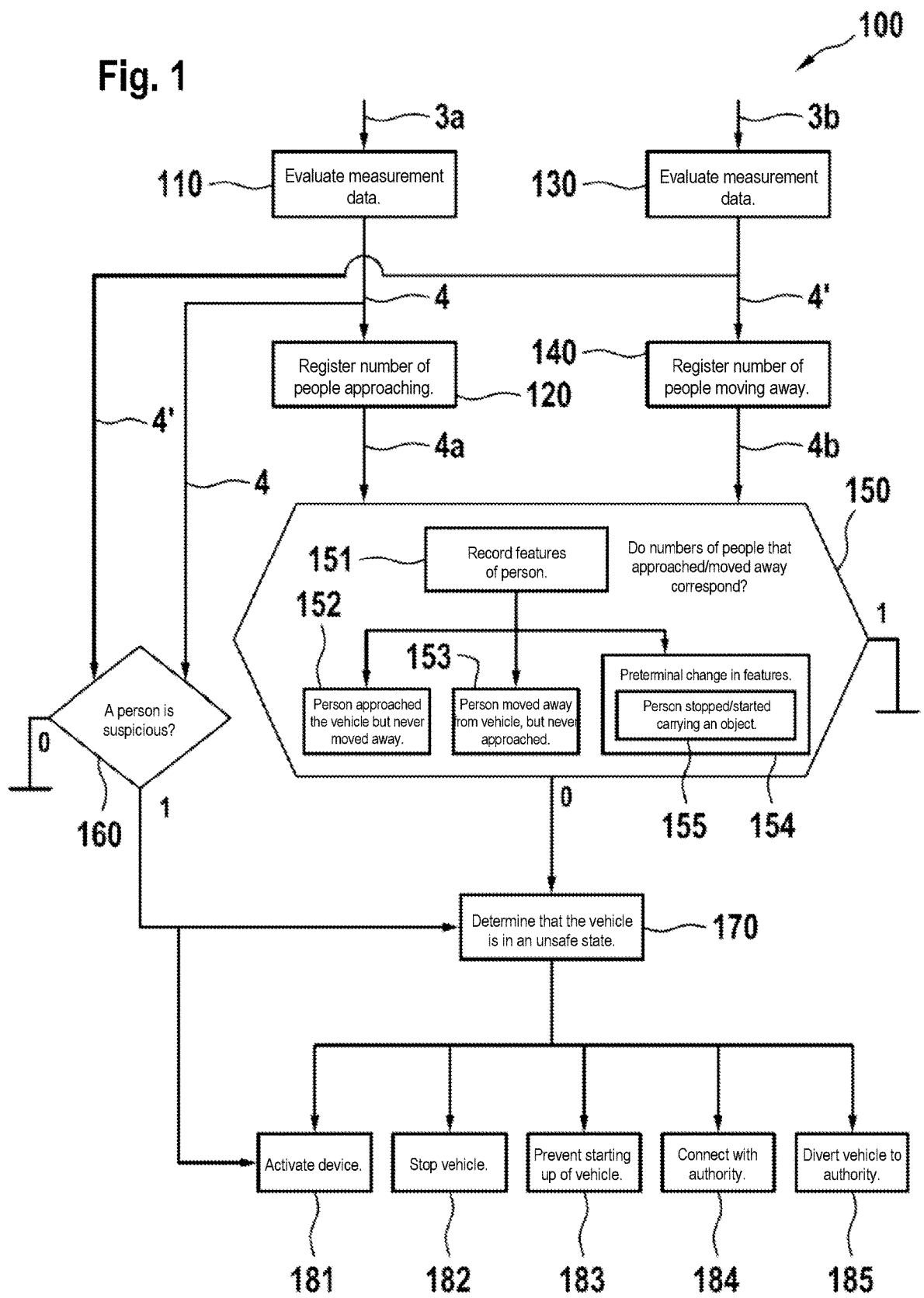
FIG. 1 shows a flow diagram of an exemplary embodiment of the method 100.

According to FIG. 1, in step 110 of the method 100 physical measurement data 3a obtained from the environment 2 of the vehicle 1 are evaluated as to whether at least one person 4 is approaching the vehicle 1. If appropriate, the number 4a of the approaching people 4 is registered in step 120.

In step 130, physical measurement data 3b obtained from the environment of the vehicle 2 are evaluated to determine whether at least one person 4' is moving away from vehicle 1. If appropriate, the number 4b of the people 4' moving away is registered in step 140. Depending on which physical contrast mechanism is used and how the measurement data 3a, 3b are specifically evaluated, the measurement data 3b may be identical to the measurement data 3a or may form a superset or a subset of the measurement data 3a. The measurement data 3a, 3b may have been recorded at the same time, but also at different times.

In step 150 a check is carried out as to whether the number 4b of the people 4 that have moved away from vehicle 1 corresponds to the number 4a of the people who have previously approached the vehicle 1. In response to a discrepancy (the truth value 0 in the check 150), it is determined in step 170 that the vehicle (1) is in an unsafe state. In one embodiment, for each person that approaches or moves away from the vehicle, features that characterize that person are recorded in each case (step 151). If (i) not all people that have approached the vehicle have later moved away from the vehicle (step 152), and/or (ii) at least one person that has not previously approached the vehicle has moved away from the vehicle, it is determined that the vehicle is in an unsafe condition (step 153). In one embodiment, it is also determined that the vehicle is in an unsafe state if one or more predetermined features of at least one person have changed in a predetermined way between two time points $t_1$ and $t_2$. (step 154). For example, the predetermined feature may include that the person is carrying an object at one of the times $t_1, t_2$ that the person is not carrying at the other time $t_2$, $t_1$ (step 155).

In addition, in step 160 a check is carried out as to whether at least one person 4 is approaching the vehicle 1 and/or whether at least one person 4' that is moving away from the vehicle 1 is exhibiting a predetermined suspicious behavior and/or is carrying a predetermined suspicious object. If this test is positive (truth value 1), it is determined that vehicle 1 is in an unsafe state. On the other hand, in accordance with block 181 an optical and/or acoustic warning device and/or a closure and/or locking mechanism of the vehicle is activated in order to prevent the approaching person 4 from further approaching the vehicle 1 and/or from remaining on the vehicle 1 and/or from entering the vehicle 1.

In response to determining 170 that the vehicle 1 is in an unsafe state, further countermeasures can be taken alternatively or in combination.

In accordance with block 182, the vehicle 1 may be stopped by intervening in at least one dynamic driving system and/or starting up the vehicle 1 may be prevented in accordance with block 183 by intervening in an immobilizer and/or in at least one dynamic driving system.

According to block 184, a communication connection may be established between at least one person 4, 4' in the environment 2 of the vehicle 1 and an authority empowered to clarify the situation. According to block 185, the vehicle 1 may be diverted to an authority authorized to clarify the situation and/or to a location specified by that authority by intervening in at least one dynamic system and/or by intervening in at least one navigation system.

Figure 2:
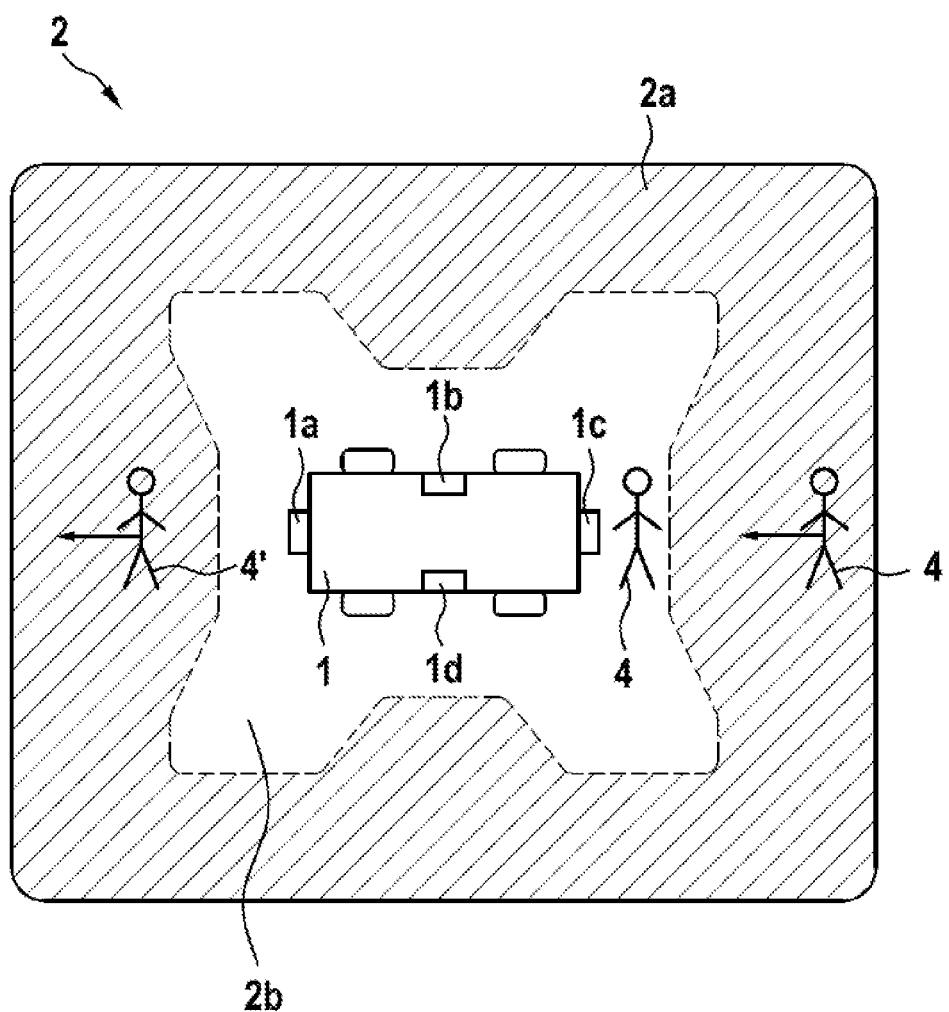
FIG. 2 shows an exemplary sketch of a scenario in which the method 100 can be used

FIG. 2 shows an exemplary scenario in which the method 100 can be used in a view that is not to scale. In this example, the vehicle 1 has four sensors 1a-1d that cover a partial area 2a of the environment 2 of the vehicle 1. In this partial area 2a, people 4 approaching vehicle 1 and people 4' that are moving away from the vehicle are registered. By recording the number 4a of people 4 approaching and the number 4b of people 4' moving away, it can be determined whether there are people 4 remaining in the area 2b immediately adjacent to the vehicle 1 that are not directly detectable by the sensors 1a-1d. These people 4 could try to conceal themselves or to conceal prohibited goods in or on the vehicle 1. However, even if they have no bad intentions, they would be acutely endangered in the event of an automated start-up of the vehicle 1.

What is claimed is:

1. A method for monitoring an environment of a vehicle comprising:

obtaining physical measurement data from the environment of the vehicle;

evaluating the obtained physical measurement data to determine whether at least one person is approaching the vehicle;

evaluating the obtained physical measurement data to determine whether at least one person is moving away from the vehicle;

checking if a number of people that have moved away from the vehicle corresponds to a number of people who have previously approached the vehicle; and determining the vehicle is in an unsafe state when the number of people that have moved away from the vehicle is different from the number of people who have previously approached the vehicle.

2. The method according to claim 1, further comprising:
additionally checking whether at least one person that is approaching or moving away from the vehicle is showing a predetermined suspicious behavior and/or is carrying a predetermined suspicious object; and
determining that the vehicle is in the unsafe state in response to a positive result of the additional check.

3. The method according to claim 2, further comprising:
activating an optical and/or acoustic warning device and/or a closure and/or locking mechanism of the vehicle to deter the person from a further approach to the vehicle and/or from remaining at the vehicle and/or from entering the vehicle in response to the positive result of the additional check and/or the vehicle being in the unsafe state.

4. The method according to claim 1, further comprising:
detecting, for each person approaching the vehicle or moving away from the vehicle, features that characterize that person; and
determining that the vehicle is in the unsafe state when (i) not all the people that have approached the vehicle have subsequently left the vehicle, and/or (ii) at least one person that has not previously approached the vehicle moves away from the vehicle.

5. The method according to claim 4, further comprising:
determining that the vehicle is in the unsafe state when one or more predetermined features of at least one person have changed in a predetermined manner between a first time and a second time.

6. The method according to claim 5, wherein the one or more predetermined features include that the person is carrying an object at one of the first time and the second time that he/she is not carrying at the other of the first time and the second time.

7. The method according to claim 1, wherein the obtained physical measurement data contain images of the environment of the vehicle.

8. The method according to claim 1, wherein the obtained physical measurement data contain radio signals of at least one portable electronic device carried by the at least one person approaching or moving away from the vehicle.

9. The method according to claim 1, further comprising:
obtaining the physical measurement data at least partially from at least one other vehicle and/or from at least one stationary measuring device.

10. The method according to claim 1, wherein in response to determining that the vehicle is in the unsafe state, the method further comprising:
stopping the vehicle by intervening in at least one dynamic driving system;
preventing a start-up of the vehicle by intervening in an immobilizer and/or in the at least one dynamic driving system;
establishing a communication link between at least one person in the environment of the vehicle and an authority authorized to clarify the situation; and/or
diverting the vehicle to an authority empowered to clarify the situation and/or to a place specified by the authority by intervening in the at least one dynamic system and/or by intervening in at least one navigation system.

11. The method according to claim 1, further comprising:
recording how many people approach the vehicle.

12. The method according to claim 1, further comprising:
recording how many people are moving away from the vehicle.

13. A non-transitory machine-readable data medium that stores a computer program for monitoring an environment of a vehicle, the computer program, when executed by a computer and/or a control device, causing the computer and/or the control device to:
obtain physical measurement data from the environment of the vehicle;
evaluate the obtained physical measurement data to determine whether at least one person is approaching the vehicle;
evaluate the obtained physical measurement data to determine whether at least one person is moving away from the vehicle;
check if a number of people that have moved away from the vehicle corresponds to a number of people who have previously approached the vehicle; and
determine the vehicle is in an unsafe state when the number of people that have moved away from the vehicle is different from the number of people who have previously approached the vehicle.

* * * * *